US006651524B2

(12) United States Patent
Dawson, Jr. et al.

(10) Patent No.: US 6,651,524 B2
(45) Date of Patent: Nov. 25, 2003

(54) FOOT THROTTLE FOR ALL-TERRAIN VEHICLES

(76) Inventors: Fred H. Dawson, Jr., 4469 Rebelle La., Port Allen, LA (US) 70767; Lee C. Wilson, Jr., 26527 Kendalwood Rd., Baton Rouge, LA (US) 70817

( * ) Notice: Subject to any disclaimer, the term of this patent is extended or adjusted under 35 U.S.C. 154(b) by 0 days.

(21) Appl. No.: 09/999,086

(22) Filed: Nov. 27, 2001

(65) Prior Publication Data

US 2003/0097898 A1 May 29, 2003

(51) Int. Cl.[7] ......................... F16H 21/40; F16H 21/52; F16H 27/08; F16H 29/20

(52) U.S. Cl. ........................... 74/513; 74/482; 74/501.6

(58) Field of Search .......................... 74/513, 523, 560, 74/481, 482, 473.15, 473.16, 470, 501.6, 479.01, 480 R; 180/336

(56) References Cited

U.S. PATENT DOCUMENTS

| | | | | |
|---|---|---|---|---|
| 1,642,376 A | * | 9/1927 | McDougall | 74/482 |
| 2,018,706 A | * | 10/1935 | Crawford et al. | 192/3.63 |
| 2,465,183 A | * | 3/1949 | Allen | 74/482 |
| 2,540,926 A | * | 2/1951 | Zook | 192/3.51 |
| 2,899,835 A | * | 8/1959 | Moreland | 74/481 |
| 3,040,596 A | | 6/1962 | Du Shane et al. | 74/482 |
| 3,600,968 A | | 8/1971 | D'Andrea | 74/481 |
| 4,059,025 A | | 11/1977 | Waack et al. | 74/482 |
| 4,109,546 A | | 8/1978 | Povejsil | 74/473.16 |
| 4,109,746 A | | 8/1978 | Breuer | 180/271 |
| 4,197,761 A | | 4/1980 | Volpi | 74/481 |
| 4,811,620 A | | 3/1989 | Old et al. | 74/471 R |
| 4,819,896 A | * | 4/1989 | Narad | 244/234 |
| 5,197,347 A | | 3/1993 | Moffitt et al. | 74/481 |
| 5,497,677 A | * | 3/1996 | Baumann et al. | 74/513 |
| 5,967,252 A | | 10/1999 | Saban et al. | 180/336 |
| 6,467,564 B1 | * | 10/2002 | Fava et al. | 180/336 |
| 6,478,103 B1 | * | 11/2002 | Matsuura | 180/90.6 |

FOREIGN PATENT DOCUMENTS

| | | | | |
|---|---|---|---|---|
| DE | 4206291 A1 | * | 12/1992 | B60K/26/02 |
| JP | 02212230 A | * | 8/1990 | B60K/26/02 |
| JP | 10083225 A | * | 3/1998 | G05G/1/21 |

* cited by examiner

*Primary Examiner*—David A. Bucci
*Assistant Examiner*—Timothy McAnulty
(74) *Attorney, Agent, or Firm*—David L. Ray

(57) ABSTRACT

A foot operated throttle for all-terrain vehicles having an engine for propelling the vehicle, two handlebars for steering the vehicle, and a throttle lever connected to one of said two handlebars for controlling the speed of the engine, the foot operated throttle including a foot pedal assembly connected to an all-terrain vehicle for selective actuation by a foot of an operator of an all-terrain vehicle, and a cable assembly connected to the foot pedal assembly and to a throttle lever mounted on a handle bar of the all-terrain vehicle for movement of the throttle lever.

9 Claims, 2 Drawing Sheets

FOOT THROTTLE FOR ALL-TERRAIN VEHICLES

BACKGROUND OF THE INVENTION

1. Field of the Invention

The present invention relates to control systems for all-terrain vehicles. In particular, the present invention relates to throttle systems for all-terrain vehicles.

2. Description of the Prior Art

All-terrain vehicles have become very popular throughout the world, and especially in the United States. All-terrain vehicles are sometimes referred to by the abbreviation "ATV". Such all-terrain vehicles have an internal combustion engine for propelling the vehicle and handlebars for steering the vehicle. Control of the throttle of the engine of an all-terrain vehicle is commonly connected to right handlebar of the vehicle by a spring loaded lever located near the end of one of the right handlebar of the vehicle. The throttle lever is positioned on the handlebar for convenient engagement by the thumb of the right hand of the rider of the vehicle while the fingers of the right hand grasp a handgrip commonly located on the end of the handlebars.

To operate the conventional throttle mounted on the right handlebar of an all-terrain vehicle, the right hand must remain on the handgrip on the handlebar for the thumb of the right hand to engage the throttle lever mounted on the handlebars. If the right hand is needed to perform other tasks, the throttle must be released causing the all-terrain vehicle to decelerate rapidly.

There is thus a need for providing a throttle system which may be engaged when the right hand is needed to perform tasks other than holding the right handlebar while the throttle of the all-terrain vehicle is depressed.

Related art of which applicants are aware are the following: U.S. Pat. Nos. 3,040,596; 3,600,968; 4,059,025; 4,109,546; 4,109,746; 4,197,761; 4,811,620; 5,197,347 and 5,967,252.

BRIEF SUMMARY OF THE INVENTION

It is an object of the invention to provide a foot-operated throttle for all-terrain vehicles.

In accordance with the present invention there is provided a foot operated throttle for all-terrain vehicles having an engine for propelling said vehicle, two handlebars for steering said vehicle, and a throttle lever connected to one of said two handlebars for controlling the speed of said engine, including a foot pedal assembly connected to an all-terrain vehicle for selective actuation by a foot of an operator of an all-terrain vehicle, and a cable assembly connected to the foot pedal assembly and to a throttle lever mounted on a handle bar of the all-terrain vehicle.

The foot throttle of the present invention has the advantage of being quickly and easily connected to any all-terrain vehicle.

The foot throttle of the invention has the additional advantage of enabling an all-terrain vehicle operator to free the hand normally used to activate the throttle of the all-terrain for other uses while the throttle of all-terrain vehicle is controlled by one foot of the operator.

DETAILED DESCRIPTION OF THE INVENTION

Figure 1:
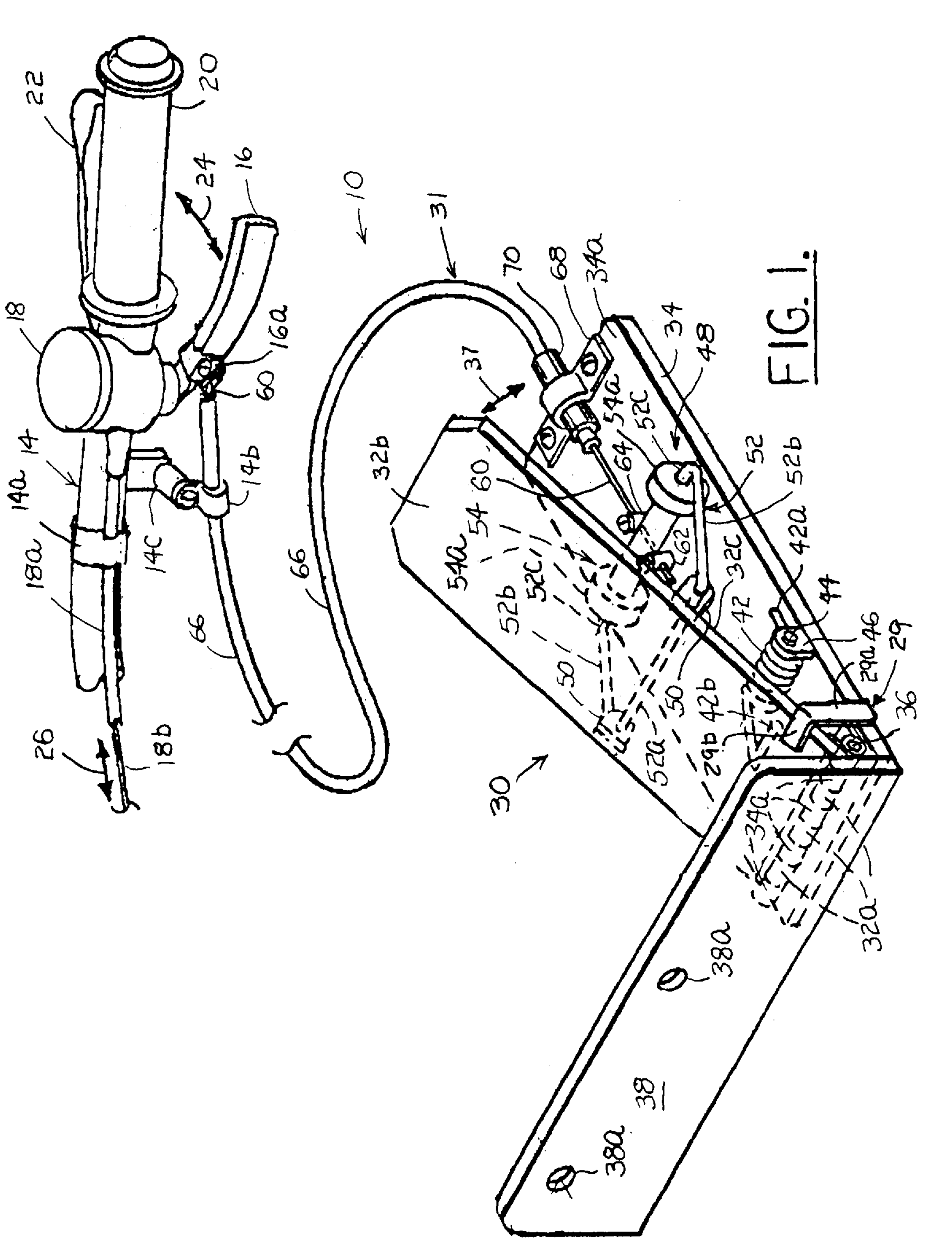
FIG. 1 is a partly cut-away perspective view of the foot throttle system of the invention.

Referring now to the drawings, and in particular to FIG. 1, the foot throttle of the invention is generally indicated by the numeral 10. A common all-terrain vehicle well known in the art on which foot throttle 10 is connected is generally indicated in FIG. 3 by the numeral 12.

Figure 3:
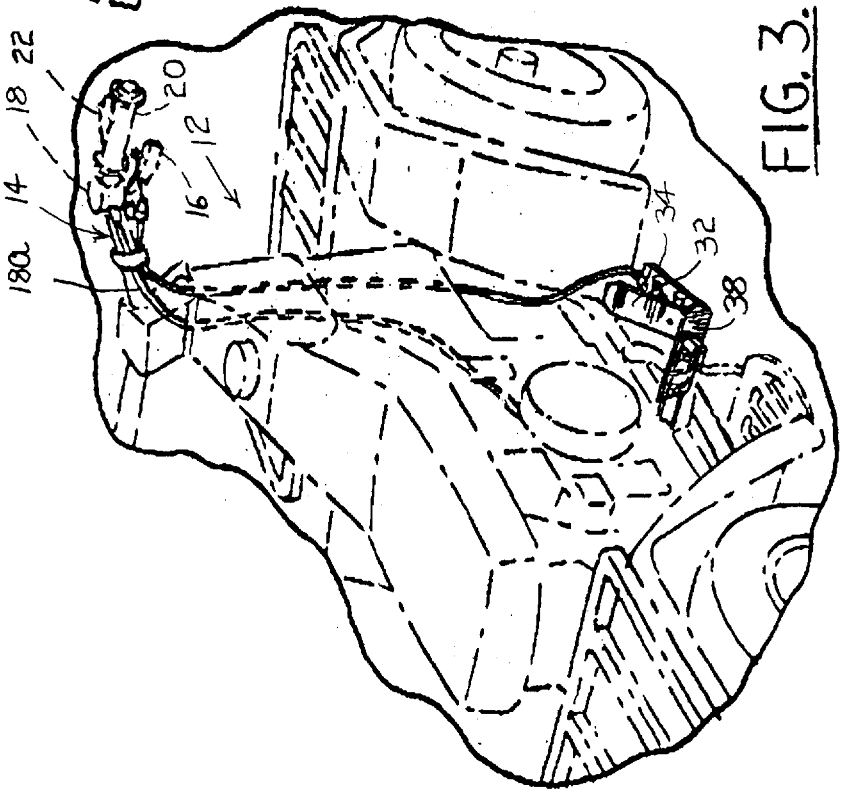
FIG. 3 is a partly cut-away perspective view of the foot throttle of FIG. 1 shown attached to a common all-terrain vehicle of the prior art depicted in phantom lines.

A portion of the right handlebar of all-terrain vehicle 12 is generally indicated by the numeral 14 in FIGS. 1 and 3. As can be best seen in FIG. 1, right handlebar 14 has a common throttle lever 16 well known in the art which is pivotally connected to common cylindrical throttle housing 18 well known in the art. Handlebar 14 also has a common handgrip 20 well known in the art connected at the end thereof, and a conventional brake actuating lever 22 well known in the art pivotally connected to handlebar 14 adjacent to handgrip 20 to slow are stop all-terrain vehicle 12.

Cylindrical throttle housing 18 is rigidly connected to handlebar 14 in a conventional manner well known in the art. A throttle cable sheath **18*a* extends from cylindrical throttle housing 18 to the throttle of the engine of all-terrain vehicle 12 as is well known in the art to control the engine speed of all-terrain vehicle 12. Throttle cable sheath 18*a* has a common movable throttle wire 18*b* therein as is well known in the art which is connected to the throttle of the engine of all-terrain vehicle 12. Throttle cable sheath 18*a* is connected to handlebar 14 by clamp 14*a***.

Thus to operate the throttle of the engine of all-terrain vehicle 12, throttle lever 16 is moved toward and away from handgrip 20 as indicated by the arrow 24 in FIG. 1 by the thumb of the right hand of the operator of all-terrain vehicle 12 as is well known in the art. Movement of throttle lever 16 causes throttle wire **18*b* to move backward and forward as indicated by the arrow 26 in FIG. 1 vary the speed of the engine of all terrain vehicle 12. Throttle housing 18 has a common spring mechanism well known in the art to bias throttle lever 16 away from handgrip 20 when the thumb of the operator of all-terrain vehicle 12 is released from throttle lever 16** to lower the speed of the engine of all-terrain vehicle to an idle.

Foot throttle assembly 10 includes a pedal assembly generally indicated by the numeral 30 which is connected to throttle lever 16 by a throttle cable assembly generally indicated by the numeral 31. Pedal assembly 30 includes a pivoting, preferably generally rectangular throttle pedal generally indicated by the numeral 32 which is depressed by the foot 33 of the operator of all-terrain vehicle 12 as indicated by the arrow 35 in FIG. 2. Throttle pedal 32 pivots upwardly and downwardly as indicated by the arrow 37 in FIG. 1.

Throttle pedal 32 has a plurality of spaced apart hollow circular rings **32*a* at one end thereof for pivotal connection to stationary base plate 34. Base plate 34 is preferably generally rectangular in shape and has a plurality of spaced apart hollow circular rings 34*a* at one end thereof for alignment and receipt between rings 32*a* for pivotal connection of throttle pedal 32 to base plate throttle pedal 32. Rings 32*a* and rings 34*a* are pivotally held in alignment by pin 36 about which rings 32*a*** rotate.

Base plate 34 is preferably rigidly connected to mounting plate 38. Mounting plate 38 preferably has a plurality of bolt receiving holes 38*a* therein for receipt of bolts 39 shown in FIG. 2. Bolts 39 are also received in existing bracket 40 of all-terrain vehicle 12 for connecting pedal assembly 30 to all-terrain vehicle 12 as shown in FIG. 3. If desired, mounting plate 38 and pedal assembly 30 could be connected to all-terrain vehicle 12 in any desired manner known to those skilled in the art. For example, mounting plate 38 could be welded to existing structural members of all-terrain vehicle 12, or mounting plate 38 could be eliminated and base plate 34 could be connected to all-terrain vehicle by bolting, welding, or the like.

A spring 42 for biasing throttle pedal 32 upwardly is coiled about pin 44. Pin 44 is rigidly connected to spring bracket 46, and spring bracket 46 is rigidly connected to the top side 34*a* of base plate 34. One end 42*a* rests against the top side 34*a* of base plate 34 and the other end 42*b* of spring 42 presses against the bottom side 32*c* of throttle pedal 32 to place an upwardly biasing force on the bottom side 32*c* of throttle pedal 32.

Figure 2:
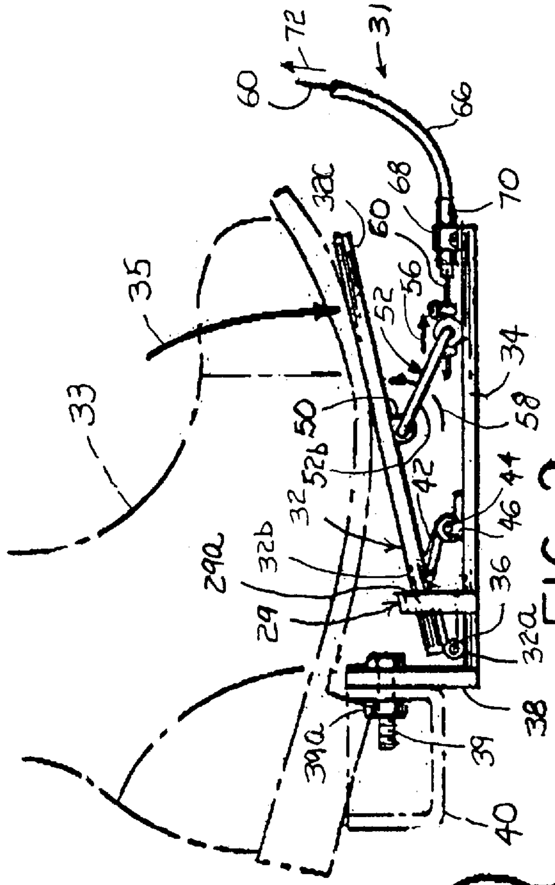
FIG. 2 is a partly cut-away side view of the foot throttle of FIG. 1 being depressed by the foot of the rider shown in phantom lines.

A pedal stopping bracket generally indicated by the numeral 29 limits the upward movement of throttle pedal 32 is shown in FIGS. 1 and 2. Pedal stopping bracket 29 has a leg 29*a* rigidly connected perpendicularly to base plate 34, and a horizontal arm 29*b* which contacts the upper surface 32*b* of throttle pedal 32 when the foot 33 of the operator is removed from throttle pedal 32.

Also connected to the bottom side 32*a* of throttle pedal 32 is a throttle cable driving assembly generally indicated by the numeral 48. Throttle cable driving assembly 48 includes two throttle cable driving assembly brackets 50—50 rigidly connected to bottom side 32*a* of throttle pedal 32. Received in brackets 50—50 is the elongated center portion 52*a* of U-shaped cable holder clamp 52. Elongated center portion 52*a* has two parallel arms 52*b*—52*b* extending therefrom which have inward turned ends 52*c*—52*c* which are parallel to elongated center portion 52*a*. Ends 52*c*—52*c* are rotatably received in the generally cylindrical cable holder 54.

Cable holder 54 is preferably generally cylindrical in shape and has two outer edges 54*a*—54*a* which slide over the top surface 34*a* of base plate 34 as indicated by the arrow 56 in FIG. 2 as throttle pedal 32 pivots downward as indicated by arrow 35 in FIG. 2. As throttle pedal 32 pivots downward as indicated by arrow 35 in FIG. 2, clamp 52 rotates in the direction indicated by the arrow 58 in FIG. 2.

Foot throttle cable 60 is a wire which is connected at its lower end to cable holder 54 by conventional cable clamps 62 and 64 and the upper end of throttle cable 60 is connected to throttle lever 16 by clamp 16*a*. The upper end of sheath 66 is rigidly connected to handle bar 14 by clamp 14*b* which is connected to bracket 14*c* on handlebar 14. Foot throttle cable 60 is slidably received in sheath 66. Sheath 66 is rigidly connected to base plate 34 by bracket 68 and rigid tube 70. Sheath 60 is snugly received in rigid tube 70 to prevent cable 60 and sheath 66 from bending at the lower end of sheath 66 as cable 60 driven into sheath 66 as indicated by the arrow 72 in FIG. 2.

As can be seen from the above detailed description of the invention, the foot throttle of the present invention can be quickly and easily connected to any all-terrain vehicle. The foot throttle 10 of the invention enables an all-terrain vehicle operator to free the hand normally used to activate the throttle lever 16 for other uses while the throttle of all-terrain vehicle 12 is controlled by one foot of the operator.

Although the preferred embodiments of the invention have been described in detail above, it should be understood that the invention is no sense limited thereby, and its scope is to be determined by that of the following claims:

What is claimed is:

1. A foot operated throttle for an all-terrain vehicle, said all terrain vehicle having an engine for propelling said vehicle, two handlebars for steering said vehicle, a handgrip connected to one of said two handlebars, and a throttle lever pivotally connected to one of said two handlebars adjacent to said handgrip for controlling the speed of said engine by an operator of said vehicle grasping said handgrip with the fingers of one hand and depressing and releasing said thumb-operated throttle lever with the thumb of said one hand, said foot operated throttle comprising:

a. a base plate rigidly connected to said all-terrain vehicle, b. a foot pedal pivotally connected to said base plate for depression and release by a foot of said operator of said all-terrain vehicle, said foot pedal having a spring for biasing said foot pedal away from said base plate, said base plate having a bracket connected thereto for limiting the movement of said pedal, and c. a cable assembly connected to said foot pedal and to said handlebar having said throttle lever connected thereto, said cable assembly including a sheath having a wire cable slidably received therein, said sheath having a first end and a second end, said wire cable having a first end and a second end, said first end of said sheath being rigidly connected to said handlebar having said thumb operated throttle lever connected thereto, said second end of said sheath being connected to said base plate, said first end of said wire cable being rigidly connected to said thumb operated throttle lever to depress and release said thumb operated throttle lever as said foot pedal is depressed and released, said second end of said wire cable being connected to said foot pedal to enable movement of said pedal to move said cable within said sheath, said foot pedal having a cable holder clamp pivotally connected thereto.

2. The foot operated throttle of claim 1 wherein said cable holder clamp has a cable holder rotatably connected thereto.

3. The foot operated throttle of claim 2 wherein said second end of said wire cable is connected to said cable holder.

4. The foot operated throttle of claim 3 wherein said cable holder is generally cylindrical in shape.

5. The foot operated throttle of claim 1 wherein said spring is connected to said base plate.

6. The foot operated throttle of claim 1 wherein said second end of said sheath is received in a rigid tube which is connected to said base plate.

7. The foot operated throttle of claim 1 wherein said base plate is adapted to be rigidly connected to said vehicle.

8. The foot operated throttle of claim 1 wherein said base plate is generally rectangular in shape.

9. The foot operated throttle of claim 1 wherein said foot pedal is generally rectangular in shape.

* * * * *